United States Patent
Michel et al.

(10) Patent No.: US 6,944,210 B1
(45) Date of Patent: Sep. 13, 2005

(54) METHOD FOR RECEIVING OR SENDING MESSAGES

(75) Inventors: Jürgen Michel, München (DE); Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,988

(22) PCT Filed: Jan. 15, 1999

(86) PCT No.: PCT/DE99/00078

§ 371 (c)(1),
(2), (4) Date: Mar. 22, 2001

(87) PCT Pub. No.: WO00/18028

PCT Pub. Date: Mar. 30, 2000

(30) Foreign Application Priority Data

Sep. 22, 1998 (DE) .................. 198 43 434

(51) Int. Cl.[7] .......... H04B 15/00; H04K 1/00; H04L 27/30
(52) U.S. Cl. .......... 375/150; 375/147; 375/142; 375/140; 370/335; 370/442; 370/441
(58) Field of Search .......... 375/140–150, 375/152; 370/335, 342, 441

(56) References Cited

U.S. PATENT DOCUMENTS

| 5,442,662 | A | * | 8/1995 | Fukasawa et al. | 370/342 |
| 5,673,260 | A | * | 9/1997 | Umeda et al. | 370/342 |
| 5,742,636 | A | | 4/1998 | Fukushi | |
| 5,748,687 | A | * | 5/1998 | Ozluturk | 375/367 |
| 5,910,948 | A | * | 6/1999 | Shou et al. | 370/335 |
| 6,038,250 | A | * | 3/2000 | Shou et al. | 375/143 |
| 6,044,074 | A | * | 3/2000 | Zehavi et al. | 370/350 |
| 6,167,037 | A | * | 12/2000 | Higuchi et al. | 370/335 |
| 6,167,056 | A | * | 12/2000 | Miller et al. | 370/441 |
| 6,226,315 | B1 | * | 5/2001 | Sriram et al. | 375/140 |
| 6,370,134 | B1 | * | 4/2002 | Aramaki | 370/342 |

FOREIGN PATENT DOCUMENTS

| EP | 0 654 913 | 5/1995 |
| EP | 0 795 971 | 9/1997 |
| EP | 0 825 737 | 2/1998 |
| EP | 0 838 910 | 4/1998 |
| WO | WO 98/40972 | 9/1998 |

OTHER PUBLICATIONS

Glišić et al., *a new approach to long code acquisition in spread spectrum radio*, Institute of Electrical Engineering, vol. 3, Jan. 1991, pp. 1281-1285.

Higuchi et al., *Fast cell search algorithm in DS-CDMA mobile radio using long spreading codes*, 1997 IEEE 47th, Vehicular Tech. Conf., pp. 1430-1434.

* cited by examiner

*Primary Examiner*—Phuong Phu
(74) *Attorney, Agent, or Firm*—Bell, Boyd & Lloyd LLC

(57) ABSTRACT

A method for receiving or transmitting messages wherein the use of shortened spreading codes, especially in the paging channel, for the purpose of correlation in the reception of CDMA signals, provides for power-saving measures such as, for example, the intermittent turn-off of A/D converters or correlators and to preserve the orthogonality of the spreading codes, the spreading codes used are selected in such a manner that, if possible, they do not correlate with the paging channel spreading code.

11 Claims, 3 Drawing Sheets

METHOD FOR RECEIVING OR SENDING MESSAGES

FIELD OF THE INVENTION

The present invention relates to a method for receiving or transmitting messages wherein different spreading codes are correlated for spread-spectrum signals in a simplified manner and orthogonality of the spreading codes can be maintained.

DESCRIPTION OF THE PRIOR ART

In a digital transmission of messages between a transmitter and a receiver, so-called spreading codes are frequently used. If a transmit signal is keyed with such a spreading code, the spectral bandwidth of the transmit signal is increased. In general, spreading codes are used with clock pulses with time constants (chips, TC) which are much smaller than the pulse widths (T) of the digital message signal. One pulse or one symbol of the digital message signal is then distributed over a multiplicity N of chips of the spreading code as a result of which the bandwidth of the message signal is correspondingly multiplied.

Important examples of such spread-spectrum transmission methods are the so-called code division multiple access (CDMA) methods which play an ever more important role; e.g., in the field of mobile telephony or of wireless data transmission. In these methods, the spread-spectrum signal is correlated with a matching spreading code in the receiver. Since different spreading codes which are not equivalent virtually have a vanishingly small correlation with one another, this method enables exactly one useful signal to be detected in a multiplicity of useful signals contained in the spread-spectrum signal, all other useful signals which have been keyed with other spreading codes in a transmitter being effectively suppressed in the receiver. A necessary prerequisite for this is generally considered to be that the receiver uses for the correlation the same spreading code as was used for keying (spreading) the useful signal intended for it.

Devices for carrying out such methods are generally of a very complex construction. Because a large and continually rising number of useful channels is needed, the spreading codes used become quite long and the corresponding clock times become shorter and shorter. This requires, for, example, correlators of corresponding complexity and with a correspondingly high clock rate.

It is an object of the present invention therefore to specify a method by which the complexity of the correlation and generally of the reception of spread-spectrum signals can be reduced.

SUMMARY OF THE INVENTION

Accordingly, the method of the present invention uses a second spreading code, which is shorter than the first spreading code used for keying the message signal in the transmitter therefor a for receiving the transmitted messages. If the first spreading code includes N chips, the second spreading sequence manages with M chips, M being smaller than N. This simplifies the process of correlation of the spread-spectrum signal with the second spreading code in the receiver. In the transmission of messages, the present invention provides for the use of suitable spreading codes via which the orthogonality of the spreading codes of different channels can be maintained.

It is true that systems are known in which a shorter spreading code is used in the receiver than in the transmitter for synchronizing the receiver with the transmitter; for example, from U.S. patent specification 5,673,260 (Method and System for CDMA Mobile Communication) of 30 Sep. 1997. During the synchronization, however, very long synchronization data sequences are used which are known exactly to the receiver. Thus, the problem here is not the detection of the data (messages) but the determination of the matching time delay between transmitter and receiver with the aid of known synchronization data. The present invention, in contrast, is used for the detection of data unknown to the receiver. If, during this process, shortened or shorter spreading codes are used in the receiver, this procedure. and the associated problems to be solved fundamentally differs from the synchronization with shortened spreading codes.

A preferred embodiment of the present invention provides an adaptation of the spreading code length to the prevailing conditions of reception in each case. The quality of reception can be determined with the aid of redundant codes and can be improved, if necessary. Using suitable spreading codes in accordance with corresponding embodiments of the present invention allows energy to be saved via intermittent turn-off or slower clocking of certain hardware units. At the transmitting end, the spreading codes can be selected, according to corresponding developments of the present invention, in such a manner that an orthogonality of the short spreading sequences (which is sufficient in practice) is ensured.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
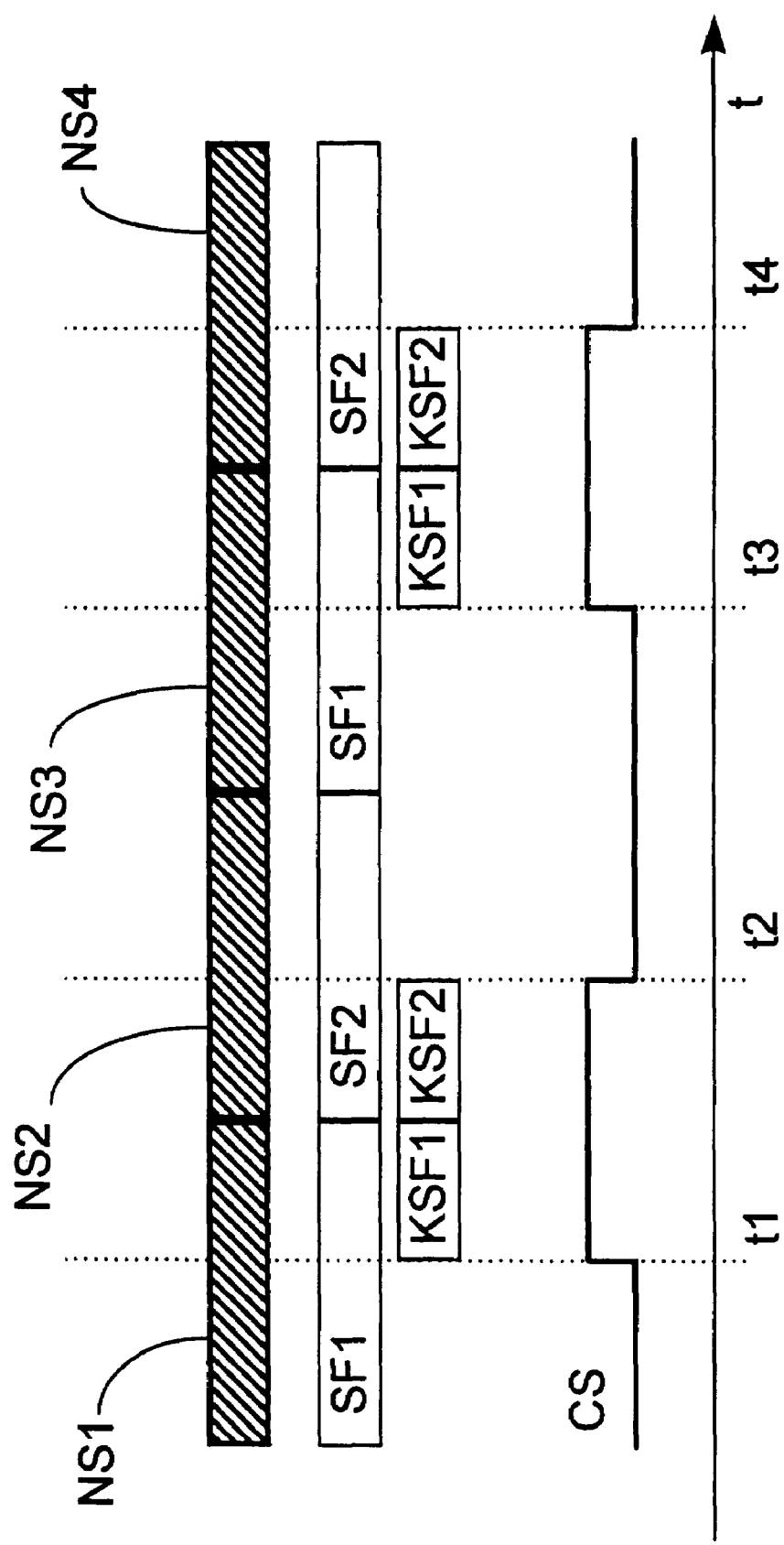
FIG. 1 shows a diagrammatic representation of a preferred choice of short spreading codes which provides for an especially energy-saving operation of the receiving equipment.

In a transmission system designed in accordance with the principle of the spread-spectrum technique, the data symbols are transmitted via the transmission channel as explained in the text which follows. The transmit signal, existing, of rectangular pulses with a period T, is keyed by a fast first spreading code of length T=N*TC. TC is here the chip period of the spreading code. It is much smaller than T so that the signal becomes a broadband signal. Ideally, a white broadband signal is produced which is transmitted via the multipath channel with signal delays (tk) and is detected in the receiver.

For the access of a number of users, mutually orthogonal spreading codes are used. For each useful channel, a separate spreading code is used which is orthogonal to therefor a other spreading codes, i.e., the correlation of which with the other spreading codes vanishes (at least in practice). For this reason, all useful channels can be transmitted simultaneously and reach the receiver via a single broad frequency band.

To detect the transmit signal, the received signal is correlated in the receiver with the same spreading code which, however, is delayed by $tK \in E\{tk\}$. This operations is also called despreading. The individual subscribers are selected with knowledge of the specific orthogonal spreading code. In addition, the paths having delays $tk \neq tK$ are suppressed since a time-shifted spreading code generally correlates (significantly) neither with other spreading codes nor with itself. Interrupting this in a different way, the receiver represents a filter which is signal-adapted to the respective useful channel and to the transmitter. Due to the correlation, unambiguous identification of the transmitter succeeds even in the case of a low signal/noise ratio.

Detection takes place as soon as a data bit has been received. It can be supported by powerful methods such as deinterleaving or channel decoding via viterbi algorithm. In this process, the redundancy of a code used for channel coding, which possibly also allows error correction, is used in the way of a step-by-step statistical estimation of the data bits, for example by a maximum aposteriori probability (MAP) method of estimation, for estimating and/or improving the quality of reception.

Such methods are known in principle. Their use in conjunction with the present invention does not provide any problems to on expert in this field after he has read the description of the present invention.

If these methods are powerful enough or if the signal/noise ratio is large enough, the useful information, thus also can be reconstructed (detected) if the correlation is not performed with the user-specific first spreading code of length $N*TC$ matching in each case, which was also used in the transmitter. This is the fundamental idea on which the present invention is based. Instead, namely a shorter or shortened second spreading code of length $M*TC$, with $M<N$, also can be used and instead of N chips, only M chips now need to be included in the signal processing.

As a result, a corresponding saving in hardware resources and energy is possible. This is because, with a suitable choice of a shortened or shorter spreading code which can be, for example, an equidistantly or non-equidistantly sub-sampled subcode of the spreading code used in the transmitter, systems having correspondingly lower clock rates or less powerful and more energy-saving processors can be used. If, on the other hand, shortened spreading codes are used which are contiguous segments of the spreading codes used in a transmitter, hardware units can be intermittently turned off and energy can thus be saved. This is particularly possible if shortened spreading codes for two successive symbols of a message to be detected are selected in such a manner that a turn-off of individual facilities of a receiving unit is possible over coherent periods of time which are as long as possible. As shown in FIG. 1, this can be implemented most simply by using a pair of shortened spreading codes, the first spreading code in time (KSF1) of which corresponds to the end of the corresponding unshortened spreading code (SF1) and the second spreading code in time (KSF2) of which corresponds to the corresponding unshortened spreading code (SF2).

Apart from shortened spreading codes in the actual sense of the word, which are genuine code segments, e.g. (a1, a4, a6, a7, a10, a11, a34, ...) of an unshortened spreading code, e.g. (a1, a2, a3, a4, a5, a6, a7, ...), other short spreading codes also can be used which can be considered to be code segments, e.g. (b1, b3, b5, b7, b9, ...) of another unshortened spreading code, e.g. (b1, b2, b3, b4, b5, b6, ...). These, however, must have a sufficiently large cross correlation with one another, essentially proportional to (a1+b1, a2+b2, a3+b3, a4+b4, ...) so that the desired message channel can be detected with an adequate signal/noise ratio and other message channels can be sufficiently suppressed. If in the context of the description of the present invention mention is made of a shortened spreading code, so that the diction does not become too obscure, such more general spreading codes, better called shorter or short spreading codes, are also meant if the opposite is not stated expressly. In general, spreading codes similarly do not need to correspond to other spreading codes in the strict sense of the word in order to provide for a useful correlation; Instead, a substantially high cross correlation is sufficient in most cases. When reading this description, this must be always considered if, for reasons of easier legibility in this description, only a (possibly only partial) correspondence of two spreading codes is simply mentioned in places.

After a bit or symbol of length $N*TC$ transmitted with the aid of the spread-spectrum technique has been received, the despreading is started. With an adequate signal/noise ratio, the transmitted symbol and the transmitted useful data can be generally completely reconstructed from this by correlation with the shortened specific spreading code of length $M*TC$. This is facilitated by utilization of the redundancy implemented in the channel coding. This results in a saving because not all transmitted chips need to be received and processed.

If, contrary to expectation, the reconstruction of the useful data is not possible, for example because of the quality of reception is too poor, the data must be made more precise by recorrelation with a spreading code which, if necessary, is longer. For this purpose, more chips must be included in the correlation. Results of previous passes can be utilized. The basis for a decision for the state of the bit transmitted in each case can be the assessment of the signal/noise ratio or of the results of the statistical estimation in the channel decoding. Having knowledge of the quality of transmission, an estimation of the minimum length of the shortened spreading code also be made in dependence on the required reliability.

Figure 2:
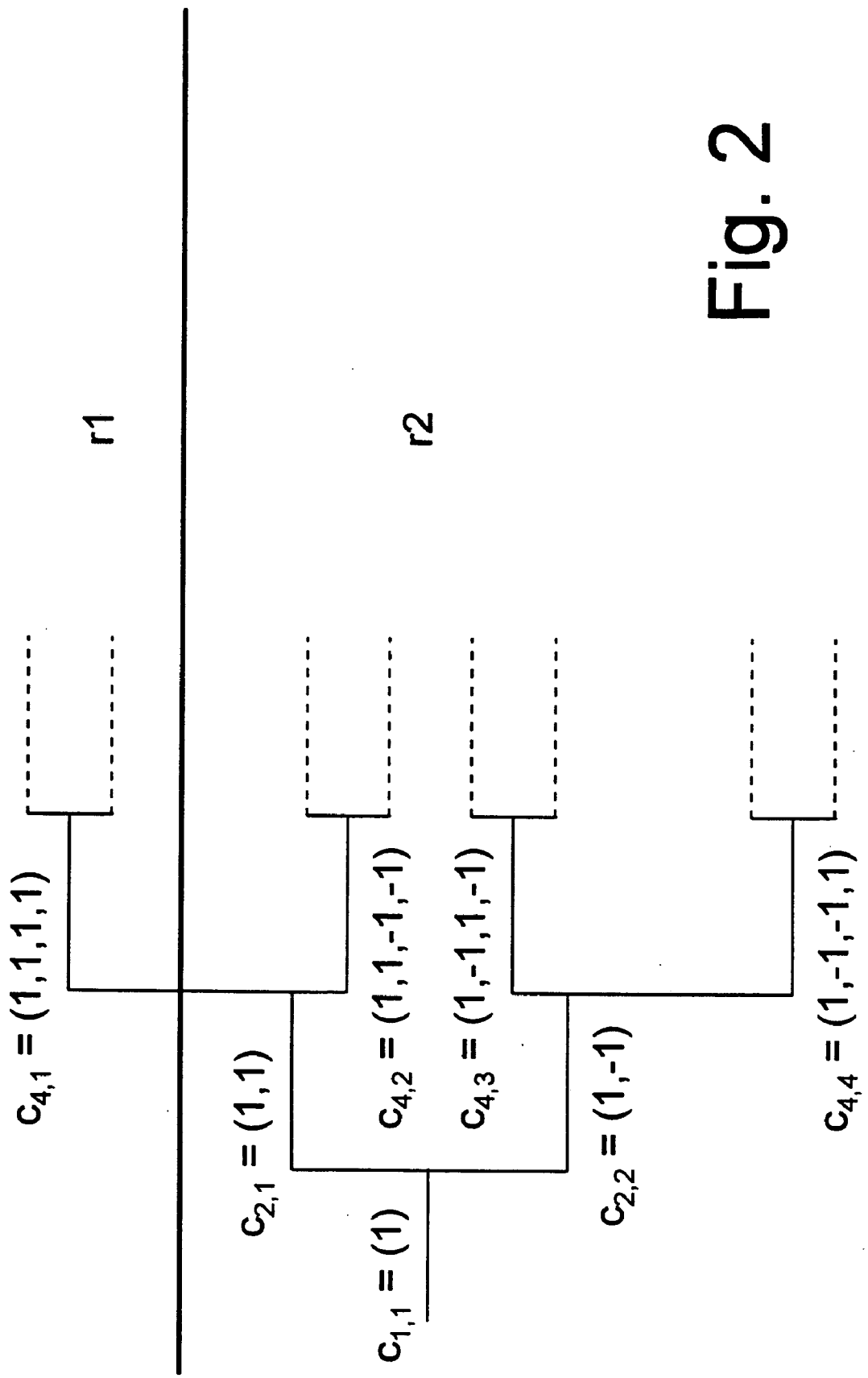
FIG. 2 shows a diagrammatic representation of a preferred selection of spreading codes by which the orthogonality of the spreading codes of different channels can be ensured.
Figure 3:
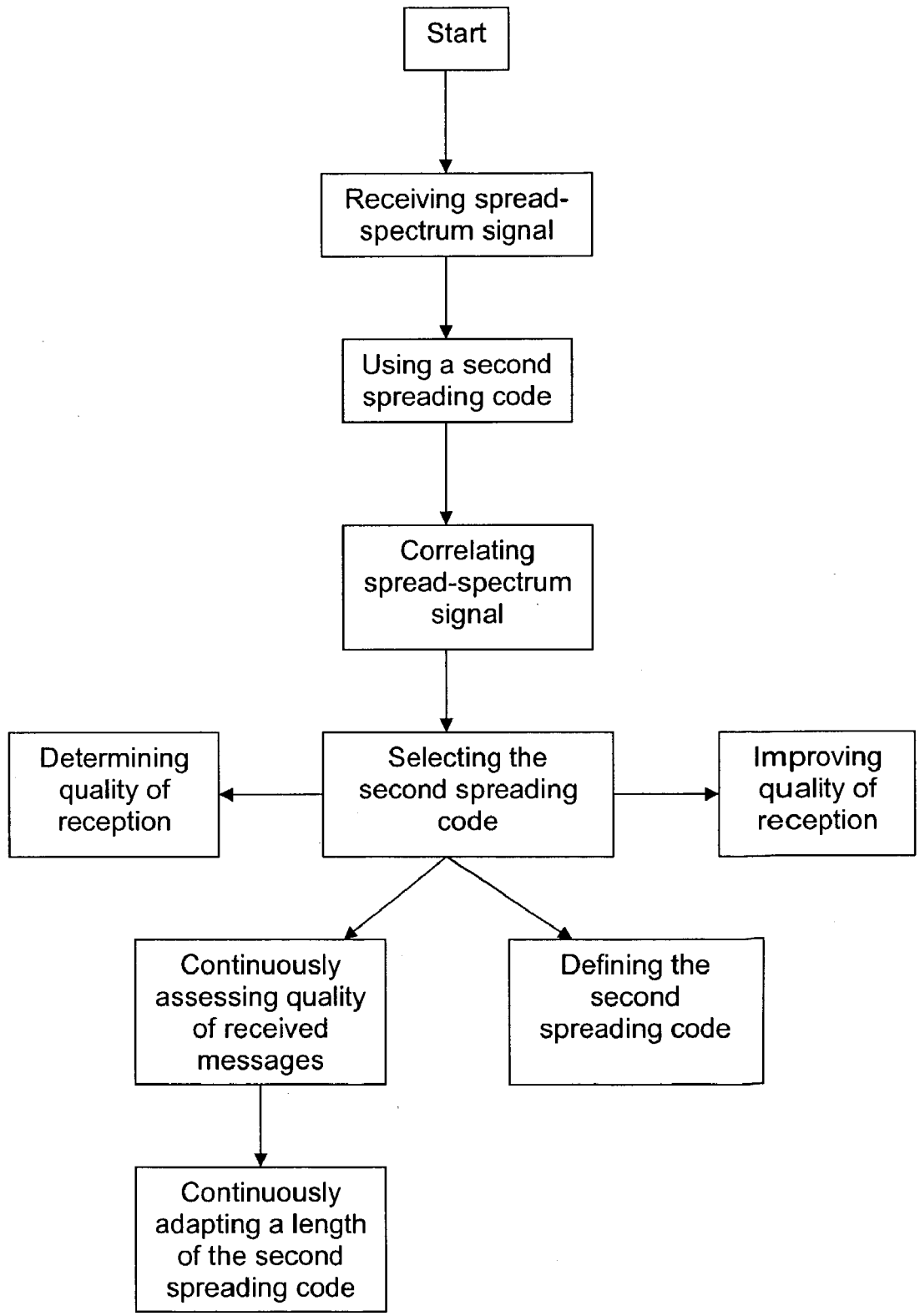
FIG. 3 shows a schematic representation of a block diagram of a method for receiving messages in a digital transmission pursuant to an embodiment of the claimed invention.

Using shorter spreading codes reduces the number of mutually orthogonal spreading codes. It is, therefore, advantageous to appropriately predetermine the mode and the order of assignment of the spreading codes to the users or, respectively, to the logical channels or, respectively, not to use certain spreading codes within a radio cell. For example, it could be provided, as shown in FIG. 2, that the spreading code, the first half of which corresponds to the spreading code of the paging channel, is not used in the system or is used only as the last one.

This principle can be applied, in particular, to the so-called paging mode and the so-called broadcast channel (BCCH). A signal is transmitted there to a number of mobile stations which are located in a radio cell. To ensure that this signal can be received by all mobile stations, it must be transmitted with a relatively high power. Most of the mobile stations are located in an advantageous position in which the quality of reception is good enough, and can use the method of correlation using shorter spreading codes described here without missing the message. The associated power saving is of particular importance in paging mode since it contributes directly and particularly noticeably to extending the stand-by time.

Analog/digital converters and correlators are particularly suitable for intermittent turn-off. This variant of the method of the present invention is particularly advantageous in connection with the choice of spreading codes shown in FIG. 1. Subsampled code segments are particularly suitable for the variant of clocking with a lower clock frequency. This description shows the expert that both measures also can be used in combination.

As shown diagrammatically in FIG. 1, the first spreading codes SF1 and SF2 are used for keying (spreading) the message symbols (data, bits, code words or similar) NS1, NS2, NS3, NS4 following one another in time in the transmitter. Using then the short or shortened spreading codes KSF1 and KSF2, which are placed in time in such a manner that the control signal CS only needs to be switched on at times t1 and t3 and switched off at times t2 and t4 for controlling the hardware facilities to be turned on and off, in the receiver. If the short spreading codes KSF1 and KSF2 are placed so that they are not contiguous in time, the control signal would have to be keyed more quickly which would cause a greater energy consumption.

FIG. 2 illustrates the relationships in selecting suitable spreading codes. These can be represented systematically in a so-called code tree which, with increasing length of the spreading codes, provides an exponentially growing number of orthogonal spreading codes. Since other types or systems of spreading codes which, lastly, are essentially equivalent, are known to the expert, only this type of spreading codes is dealt with here. However, the present invention can be carried out just as well using other types of spreading codes. To prevent a loss of orthogonality due to the use of shorter or shortened spreading codes, it is useful to reserve the spreading codes in area r1 for the paging channel and only to use the spreading codes from area r2 for spreading individual user channels.

Indeed, although the present invention has been described with reference to specific embodiments, those of skill in the art will recognize that changes may be made thereto without departing from the spirit and scope of the invention as set forth in the hereafter appended claims.

We claim:

1. A method for receiving messages in a digital transmission, the method comprising the steps of:
   receiving a spread-spectrum signal keyed with a first spreading code at a receiver;
   using a second spreading code which is shorter than the first spreading code to receive the spread-spectrum signal;
   correlating the spread-spectrum signal with the second spreading code at the receiver; and
   selecting the second spreading code to be as short as possible to still enable messages to be received with sufficient quality and reliability.

2. A method for receiving messages in a digital transmission as claimed in claim 1, the method further comprising the steps of:
   continuously assessing the quality of the received messages; and
   continuously adapting a length of the second spreading code to an instantaneous quality of reception such that an adequate quality of reception is achieved.

3. A method for receiving messages in a digital transmission as claimed in claim 1, the method further comprising the step of:
   determining the quality of reception with the aid of redundant codes which were used for channel coding of the messages.

4. A method for receiving messages in a digital transmission as claimed in claim 1, the method further comprising the step of:
   improving the quality of reception with the aid of error correction codes which were used for channel coding of the messages.

5. A method for receiving messages in a digital transmission as claimed in claim 1, the method further comprising the step of:
   defining the second spreading code to be a code segment of the first spreading code.

6. A method for receiving messages in a digital transmission, the method comprising the steps of:
   receiving a spread-spectrum signal keyed with a first spreading code at a receiver;
   using a second spreading code which is shorter than the first spreading code to receive the spread-spectrum signal;
   correlating the spread-spectrum signal with the second spreading code at the receiver, wherein individual facilities of the receiver are at least one of intermittently turned off and operated at a lower clock frequency due to the second spreading code being shorter than the first spreading code.

7. A method for receiving messages in a digital transmission as claimed in claim 6, wherein the intermittent turning off of the individual facilities of the receiver is controlled by a control device such that power consumption of the receiver is as low as possible with a predetermined quality of reception.

8. A method for receiving messages in a digital transmission as claimed in claim 7, wherein shortened spreading codes are selected for two successive symbols of a message to be detected such that the individual facilities of the receiver can be turned off over coherent periods of time which are as long as possible.

9. A method for receiving messages in a digital transmission as claimed in claim 6, the method further comprising the step of: defining the second spreading code to be a code segment of the first spreading code.

10. A method for receiving messages in a digital transmission, the method comprising the steps of:
    receiving a spread-spectrum signal keyed with a first spreading code at a receiver;
    using a second spreading code which is shorter than the first spreading code to receive the spread-spectrum signal; and
    correlating the spread-spectrum signal with the second spreading code at the receiver, wherein the second spreading code is extended to form a third spreading code which is also shorter than the first spreading code if the quality of reception is not adequate when the second spreading code is used.

11. A method for receiving messages in a digital transmission as claimed in claim 10, the method further comprising the step of:
    defining the second spreading code to be a code segment of the first spreading code.

* * * * *